United States Patent
Masera et al.

(10) Patent No.: US 7,912,426 B2
(45) Date of Patent: Mar. 22, 2011

(54) PRODUCTION OF VISUAL CODES FOR PAIRING ELECTRONIC EQUIPMENT

(75) Inventors: Eric Masera, Paris (FR); Santie V. Adelbert, Vincennes (FR); Christophe E. Papin, Bois Colombes (FR); Thierry Lebihen, Bourg la Reine (FR)

(73) Assignee: Eastman Kodak Company, Rochester, NY (US)

( * ) Notice: Subject to any disclaimer, the term of this patent is extended or adjusted under 35 U.S.C. 154(b) by 592 days.

(21) Appl. No.: 11/863,302

(22) Filed: Sep. 28, 2007

(65) Prior Publication Data

US 2008/0081666 A1    Apr. 3, 2008

(30) Foreign Application Priority Data

Oct. 2, 2006   (FR) ...................................... 06 08591

(51) Int. Cl.
*H04B 5/00* (2006.01)

(52) U.S. Cl. .................. 455/41.2; 455/41.1; 455/414.4; 455/90.2; 455/566; 235/462.08; 340/572.8

(58) Field of Classification Search ................ 455/41.1, 455/41.2, 414.4, 90.2, 566, 550.1, 557, 418; 235/462.08, 462.04; 340/572.8
See application file for complete search history.

(56) References Cited

U.S. PATENT DOCUMENTS

| | | | | |
|---|---|---|---|---|
| 3,776,438 A * | 12/1973 | Calberg | ........................... | 225/93 |
| 4,420,682 A * | 12/1983 | Huber | ....................... | 235/472.01 |
| 5,809,265 A * | 9/1998 | Blair et al. | ..................... | 715/764 |
| 5,899,700 A * | 5/1999 | Williams et al. | .............. | 434/308 |
| 5,978,772 A * | 11/1999 | Mold | ............................... | 705/16 |
| 6,331,898 B1 * | 12/2001 | Yokoi et al. | .................... | 358/1.9 |
| 6,946,672 B1 * | 9/2005 | Lapstun et al. | ................ | 250/566 |
| 6,983,886 B2 * | 1/2006 | Natsukari et al. | .......... | 235/462.1 |
| 7,123,742 B2 * | 10/2006 | Chang | ........................... | 382/100 |
| 7,240,036 B1 * | 7/2007 | Mamdani et al. | ................ | 705/75 |
| 7,246,745 B2 * | 7/2007 | Hudnut et al. | ................. | 235/383 |
| 7,272,407 B2 * | 9/2007 | Strittmatter et al. | .......... | 455/500 |
| 7,283,983 B2 * | 10/2007 | Dooley et al. | .................... | 706/20 |
| 7,286,152 B2 * | 10/2007 | Mindler et al. | ................ | 347/212 |
| 7,296,747 B2 * | 11/2007 | Rohs | ........................ | 235/462.08 |
| 7,341,198 B2 * | 3/2008 | Nishizawa et al. | ........... | 235/492 |
| 7,609,406 B2 * | 10/2009 | Roth et al. | ..................... | 358/1.15 |
| 7,614,065 B2 * | 11/2009 | Weissmueller et al. | ......... | 725/22 |
| 7,647,074 B2 * | 1/2010 | McCoog et al. | .............. | 455/566 |
| 7,672,532 B2 * | 3/2010 | Weigand | ....................... | 382/274 |
| 7,742,950 B2 * | 6/2010 | Wolinsky et al. | ................ | 705/26 |
| 2002/0158127 A1 * | 10/2002 | Hori et al. | ...................... | 235/454 |
| 2003/0189731 A1 * | 10/2003 | Chang | ........................... | 358/3.28 |
| 2004/0046024 A1 * | 3/2004 | Natsukari et al. | ............. | 235/454 |
| 2005/0062637 A1 * | 3/2005 | El Zabadani et al. | ......... | 341/176 |
| 2005/0101250 A1 * | 5/2005 | Helal et al. | ..................... | 455/41.2 |
| 2005/0189412 A1 * | 9/2005 | Hudnut et al. | ................. | 235/383 |
| 2006/0013502 A1 * | 1/2006 | Weigand | ....................... | 382/275 |
| 2006/0261164 A1 * | 11/2006 | Bochicchio | .................... | 235/385 |
| 2008/0084293 A1 * | 4/2008 | Adelbert | ..................... | 340/539.1 |

(Continued)

*Primary Examiner* — Minh D Dao
(74) *Attorney, Agent, or Firm* — Nelson Blish

(57) ABSTRACT

The invention is intended for the technological field of data communication between electronic equipment (1-4) forming part of a system of electronic equipment (10). The invention more specifically relates to a method and a system to facilitate, using an identifier having the form of a visual code, the transmission of command data to one of the electronic equipment items of the system, when the electronic equipment that produces the visual code is activated. The transmission of command data intended for one of the equipment items is performed following the reading and decoding of the visual code, for example with another equipment item of the system.

19 Claims, 4 Drawing Sheets

U.S. PATENT DOCUMENTS

2009/0112815 A1* 4/2009 Antognini et al. ................ 707/3
2009/0235098 A1* 9/2009 Matsunaga ................... 713/320
2010/0045681 A1* 2/2010 Weissmueller et al. ....... 345/501
2010/0101873 A1* 4/2010 Lapstun et al. ............ 178/18.09

* cited by examiner

PRODUCTION OF VISUAL CODES FOR PAIRING ELECTRONIC EQUIPMENT

CROSS REFERENCE TO RELATED APPLICATIONS

This is an application claiming priority to French Patent Application No. 0608591, filed Oct. 2, 2006.

FIELD OF THE INVENTION

The invention is intended for the technological field of data communication between electronic equipment forming part of a system of electronic equipment. The electronic equipment of the system are compatible for inter-communicating data using links, preferably wireless. The invention more specifically relates to a method and a system for producing a visual code and using this visual code in order to transmit data and commands between the electronic equipment of a system, when the electronic equipment that produces the visual code is activated. The transmission of command data intended for an equipment item is performed following the reading and decoding of the visual code, for example with other equipment of the system.

BACKGROUND OF THE INVENTION

The variety and multiplicity of electronic equipment or devices capable of inter-exchanging coded or non-coded digital data increases the difficulty of performing the pairing of this equipment, so that the exchange of data occurs correctly. This equipment can, for example, inter-communicate using wireless links, which happens when the data exchanges take place using Internet type networks. For short distance exchanges, Bluetooth or Wireless Fidelity (Wi-Fi) links are widely used.

Computing protocols exist enabling, based on electronic equipment or terminals, neighboring equipment or terminals to be recognized, including those that the equipment user does not know. Neighboring terminals are, for example, displayed on a display screen of said equipment.

To facilitate the interaction and data exchanges between these terminals, methods exist so that the equipment pairs easily, i.e. so that they can inter-exchange data. Thus, using coded data one can pair, for example, two mobile phones, or a mobile phone with a printer, or a phonecam with a photographic kiosk.

Visual identifications or identifiers, like for example two-dimensional identifiers such as barcodes in two dimensions (or 2D barcodes), are patterns of points intended to encode data. These barcodes can contain data intended, for example, to pair electronic equipment. These identifiers are commonly used in industry, for example to monitor and/or inspect flows of parts or products. The 2D barcode is, for example, printed on a packaging containing a food product.

A new use of these identifiers has appeared following the omnipresence of mobile phones and phonecams. Patterns of encoded data, like barcodes, are produced to prevent data repetition, for example using the keypad of a mobile phone, in order to pair this mobile phone with other electronic equipment. For example, a uniform resource locator (URL) characterizing an address in the Internet is encoded in the 2D barcode. A user approaches or points, for example, their phonecam at the 2D barcode. The 2D barcode is captured, then scanned with the phonecam, the URL (or address) is then decoded using a decoding module integrated into the phonecam, and a connection is automatically made between the phonecam and, for example, the website of the manufacturer of the food product corresponding to the URL address; this connection thus enables the user to obtain more information on the product.

In the field of electronic equipment, a need has emerged to easily pair, i.e. simply and rapidly, two electronic equipment items and connect them to execute, for example between the two items, operations of data sharing or communication, or executing printouts of digital data, or synchronizing image displays between the two equipment items. The connection between the two electronic equipment items can be realized, for example, using 2D barcodes that contain data specific to the hardware, specific to each of the two equipment items, or specific to a bus type accessory placed as appendage to one of the equipment items. The barcode is specific to one of the equipment items; the equipment to which the barcode is assigned is, for example, a printer. Practically, the barcode is printed and placed on the equipment, if the equipment does not have a display screen. Or, if the equipment has a display screen, the barcode can be displayed on the equipment's screen. Then, this barcode is scanned using the other equipment, to make a connection between the two equipment items. The production of a barcode for an equipment item requires additional operations during the manufacture of the equipment, since either the barcode specific to the equipment has to be printed and affixed to the equipment, or the barcode has to be loaded into the equipment, so that it is displayed, for example, when the equipment is started up. These additional operations have the disadvantage of increasing the time to manufacture the equipment, and, consequently, the cost of manufacturing this equipment.

Also, another disadvantage appears when the barcode is previously affixed to the equipment or displayed on the screen of the equipment: a potential user does not obtain clear information or does not perceive, for example when they unwrap or use the equipment for the first time, that the barcode is an effective means of connecting with the equipment and obtaining, for example, a service from this equipment. In other words, the user does not necessarily see the presence of the barcode as a means for pairing and connecting equipment bearing or displaying the barcode with other equipment like, for example, a mobile phone that the user has in their possession.

SUMMARY OF THE INVENTION

The purpose of the invention is to remedy the above-mentioned disadvantages of the state-of-the-art.

The object of the invention is to provide a command method of a first electronic equipment item forming part of a system of compatible electronic equipment, the system comprising a second electronic equipment item capable of producing a visual code and a third electronic equipment item capable of reading a visual code, the method comprising the following steps:

a) in response to the activation of the second equipment item, the automatic production of a visual code comprising command execution data, and, b) in response to the reading of the visual code by means of a third equipment item, the decoding of the visual code to extract command data from it and the transmission of the command data to the first equipment item to execute them with the second equipment item.

In an advantageous embodiment of the command method, the visual code comprises the data of an executable program intended for the third equipment item and comprising the automatic execution instructions of step b).

In a particular first embodiment of the command method, the execution of the command from the first equipment item is the execution, based on the first equipment item, of a transmission and printing instruction of data to the second equipment item. The transmitted and printed data are, for example, text and/or image data. The first equipment item is, for example, a mobile phone and the second equipment item is, for example, a printer.

The command method is implemented in a system of compatible electronic equipment. The compatibility of the equipment is realized by a hardware and software configuration of the equipment of the system to perform data communications between the equipment.

In a preferred embodiment of the command method, data communication between the equipment is performed using a wireless link, for example Bluetooth or Wi-Fi.

In a preferred embodiment of the command method, the activation of the second equipment item is the powering up of the second equipment item. But the activation of the second equipment item can also be a software download into the second equipment item using, for example, other equipment of the system.

In a particular embodiment of the invention, the production of the visual code is performed using a printing unit, like a printer for example. The visual code is a barcode or, preferentially, a two dimensional code. The visual code can also be displayed, for example, on a screen of the second equipment item.

According to a first variant of the embodiment, the visual code is printed on self-adhesive support applied to the second equipment item. The self-adhesive support can also comprise legible instructions for using the visual code. The visual code can be detached easily from the self-adhesive support, for example using pre-cut lines.

According to a preferred embodiment of the command method, the first equipment item and the third equipment item can form a single terminal. The single terminal is, for example, a digital camera or phonecam equipped with means for reading and decoding visual codes. Reading the visual code comprises an initial step of capture of the image of the visual code.

A data subset encoded in the visual code can contain equipment identification data, like for example an equipment network address expressed in alphanumeric form. The visual code can also comprise a data subset relating to physical data processing or storage units specific to the equipment. The visual code can also comprise a data subset specific to the software implemented with the equipment, or data specific to the software used to make a connection and realize the communication of data between the three equipment items, based on, for example, the activation of the second equipment item.

In an embodiment of the command method aiming to make secure data communication between the equipment, the visual code advantageously comprises encrypted data.

The object of the invention is also to provide a system to command a first electronic equipment item forming part of a system of compatible electronic equipment; the system comprising a second electronic equipment item capable of producing a visual code when activated, and a third electronic equipment item capable of reading and decoding a visual code, the command of the first equipment item being performed according to one of the embodiments of the command method described above.

Other characteristics and advantages of the invention will appear on reading the following description, with reference to the various figures.

DETAILED DESCRIPTION OF THE INVENTION

The following description is a detailed description of the invention, with reference to the drawings of the various figures.

Figure 1:
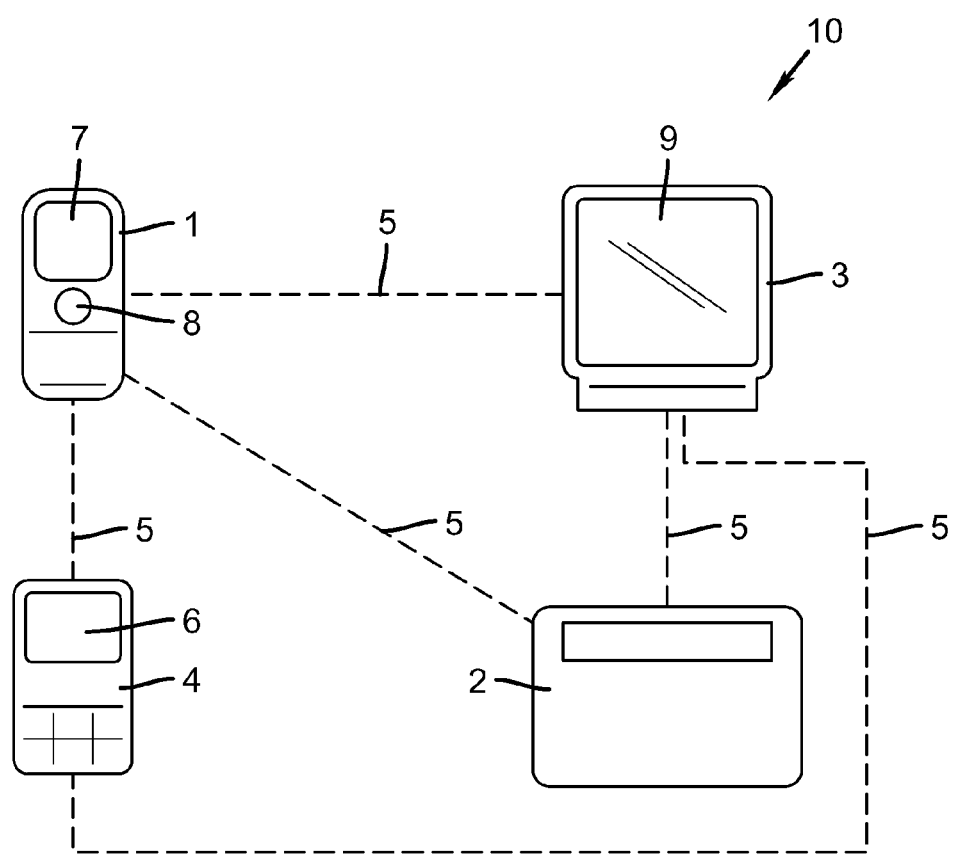
FIG. 1 schematically shows a system of electronic equipment used to implement the invention.

FIG. 1 schematically shows an example of a system of electronic equipment 10 that can be used to implement the invention. A first electronic equipment item 1 is, for example, a digital camera or a phonecam provided with a display screen 7 and an image sensor 8. A second electronic equipment item 2 is, for example, a printer. But, the electronic equipment 2 can also be, for example, an electronic printing platform or a photographic kiosk. Other electronic equipment 3 and 4 makes up the system 10 and can communicate with the phonecam 1 or with the printer 2. Equipment item 3 is, for example, a personal computer or PC or a television set equipped with a display screen 9. The equipment item 4 is, for example, a mobile phone equipped with a display screen 6.

Communication links 5 enable data exchanges, like for example the digital data of text and/or images, between the various equipment items. Advantageously the links 5 are wireless links, like for example Bluetooth or Wi-Fi links.

Figure 2:
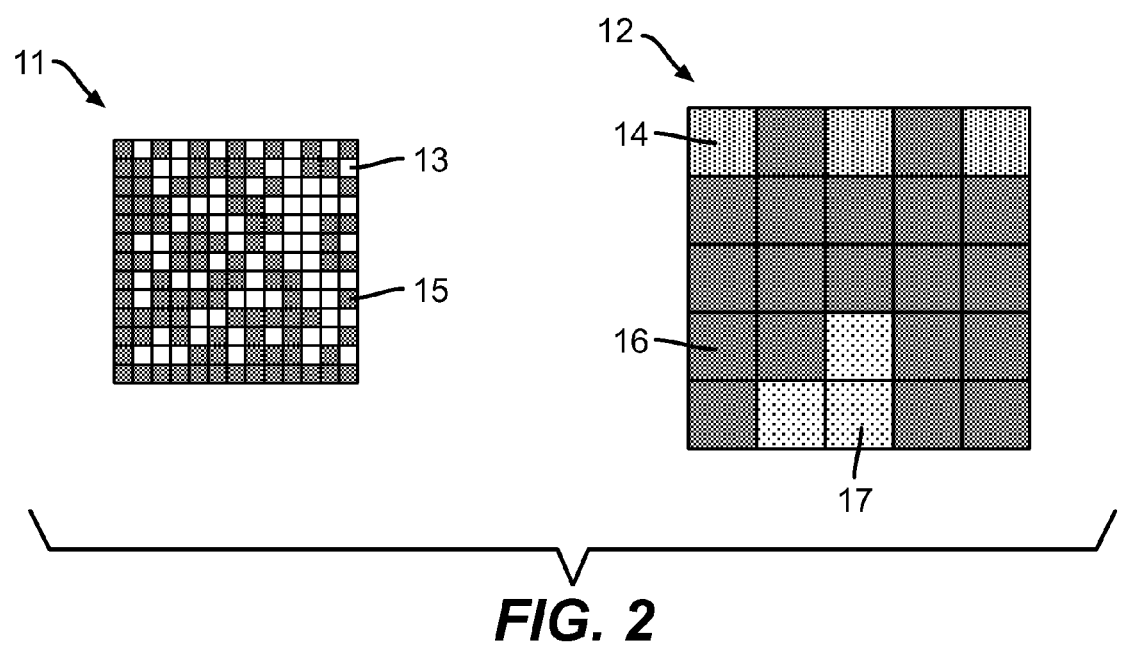
FIG. 2 schematically shows examples of visual codes that can be used to implement the invention.

FIG. 2 schematically shows examples of two-dimensional (or 2D) visual codes 11 and 12. Typical examples of barcodes are: Data Matrix, quick response code (QR) or PDF 417. However, the visual code can also be a barcode, i.e. a code according to a dimension represented by parallel lines. The visual code 11, 12 is intended to codify something, for example an Internet address, in the form of an identifier or a single symbol. The identifier has the form of a single pattern of elementary modules 13, 14, 15, 16, 17. The visual code 11 is, for example, a black and white 2D code, i.e. the elementary modules are either white, like the elementary module 13, or black or even shaded, like the elementary module 15. The visual code 12 can be a 2D code in color, i.e. the elementary modules are represented in color: the elementary module 14 is, for example, green; the elementary module 16 is, for example, blue; the elementary module 17 is, for example, red or orange. Black and white elementary modules can also be used to represent the visual code in color 12.

The visual codes 11 and 12 are preferably used to encode the data of software characterizing a special IT application. The visual code 11, 12 can encode several thousand bytes of data including alphanumeric, numeric or binary data (e.g. zero, one). The visual code 11, 12 can contain data relating to the identification, connection means, hardware, or software of the electronic equipment. For example, data saved in the visual code can be the Bluetooth data needed to make a Bluetooth connection or the data of a uniform resource locator (URL), i.e. an address to access an Internet online service. The visual code can also contain encrypting data, like, for example, a wired equivalency privacy (WEP) encryption key. The encoded data can be read and decoded, for example by the phonecam 1, by performing an image capture of the visual code to read the visual code and then decode it. The reading and decoding of the visual code are performed with a reading-decoding module advantageously included in the case of the phonecam 1.

The visual code 11, 12 is also advantageously used to encode data containing configuration parameters. Configuration parameters are intended to make two equipment items of the system 10 compatible. The compatibility of the two equipment items consists in performing a hardware and/or software configuration of the equipment, i.e. selecting characteristics specific to the physical units of data processing or storage, or to the software, of the system 10 equipment to enable this equipment to communicate the data to another equipment item of the system 10.

The visual code 11, 12 is also advantageously used to encode data relating to the services available on an equipment item. For example, the visual code can describe the printing formats available on the printer 2.

The visual code 11, 12 is an interactive element intended to make the user aware when it is produced or edited, so that the user perceives the visual code as a means of pairing two electronic equipment items of the system 10.

According to a first preferred embodiment of the invention method, the system 10 preferably comprises wireless links, for example of Bluetooth type, and one of the electronic equipment items of the system 10 is, for example, a printer 2. The printer 2 comprises software capable of reading the data specific to one or more hardware units of the printer 2. The software can advantageously identify an address of the printer 2 in the system 10 network. The address of the printer 2 can be displayed, for example permanently and virtually, by means of a barcode affixed to the printer. But, the address of the printer 2 can also be, for example, temporarily displayed on a screen of the printer, in response to an activation of this printer. In the last example, the address of the printer 2 is, for example, a media access control (MAC) type alphanumeric address and a port number. The software of the printer 2 also comprises an algorithm to convert information data specific to the hardware of the printer 2 and in particular contains the MAC address of the printer, in a visual code like that of FIG. 2. The visual code 11 is, for example, an assembly in two dimensions 5 (or 2D) of black 15 and white 13 squares.

Figure 3:
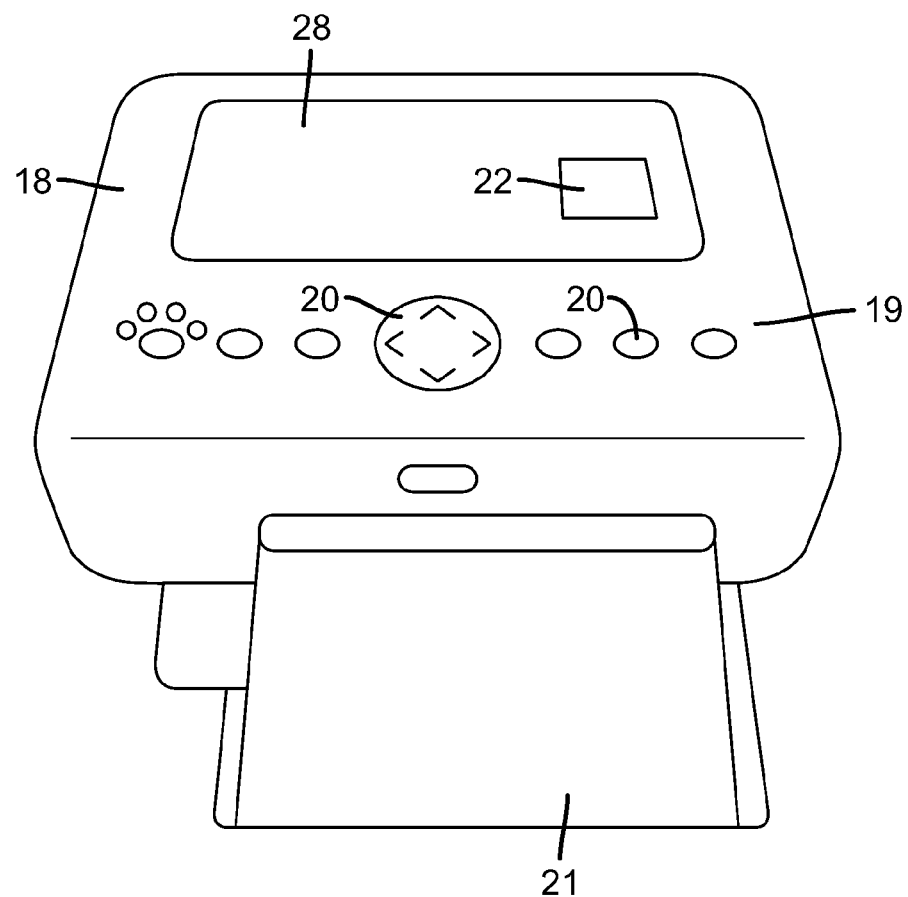
FIG. 3 schematically shows an electronic printing platform comprising a visual code according to FIG. 2.

According to FIG. 3, in a particular embodiment, the printer 2 is an electronic printing platform 18 with a location 22 intended to receive a visual code 11, 12. The electronic printing platform 18 comprises a command keyboard 19, equipped with command buttons 20. One of the command buttons 20 enables the electronic printing platform 18 to be activated, i.e. for example, enables it to be powered up. The electronic printing platform 18 also comprises a printing plate 21 to receive printing editions commanded on the platform.

Figure 4:
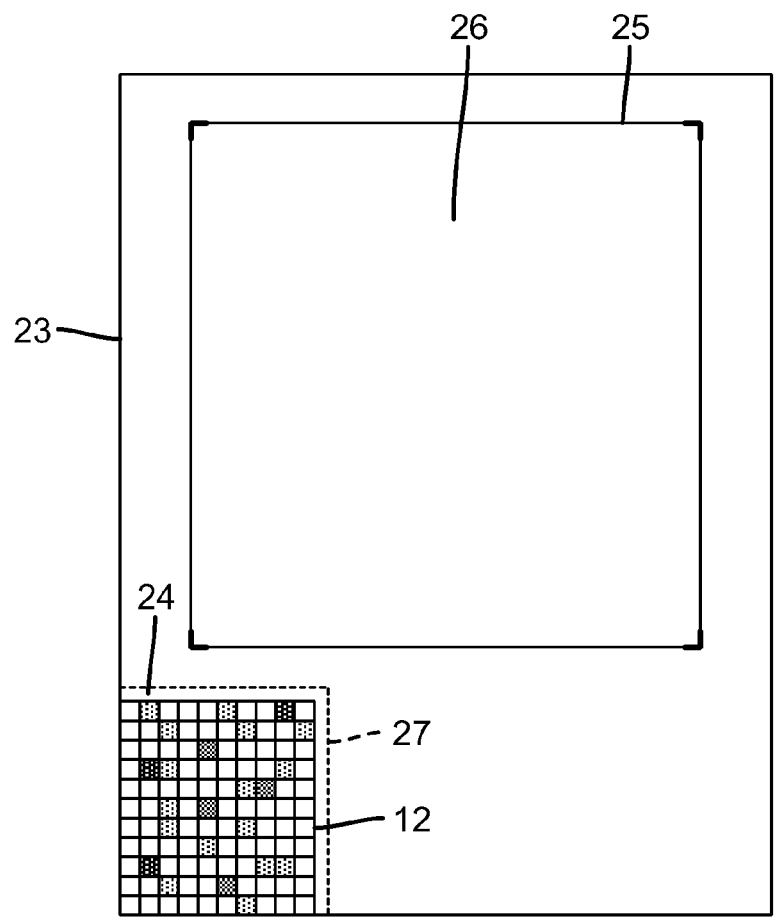
FIG. 4 schematically shows an example of visual code support preferably used to implement the invention.

When the electronic printing platform 18 is activated, the previously described software enables the starting of the automatic edition of a support 23 like that drawn according to FIG. 4.

In another embodiment, the visual code can also be edited in the form of an image displayed on a display screen 28 specific to the electronic printing platform 18.

In a particular embodiment, printing of the support 23 occurs on the first start up of the electronic printing platform 18. But, in an advantageous embodiment, printing of the support 23 occurs, for example, on the modification of the hardware or on an evolution of the software of the electronic printing platform 18. In the last case, printing of the visual code is started with a command button 20 of the keyboard 19. Printing of the visual code can also advantageously be started when the presence of a new functionality described in the 2D barcodes is detected (read) for the first time. The support 23 is, for example, a support in self-adhesive paper comprising two locations 24 and 25. The location 24 is intended to receive, for example, the symbol of the 2D visual code in color 12.

According to a preferred embodiment, the visual code 12 can be detached from the self-adhesive support 23, for example along the pre-cut lines 27 on the support 23.

The location 25 is intended to display information that is advice or legible and understandable instructions 26 explaining how to use the 2D visual code in color 12. The instructions advantageously define where to place the visual code on the equipment, for example on the printer, and how to use it in relation with other electronic equipment capable of communicating with the printer. On the location 25, the following instruction 26 is for example printed: "To obtain a print, detach the pattern placed at the bottom left of the support along the dotted lines and stick the pattern on the printer, then use the printing software with your digital camera or phone to profit from a remarkable ease of use."

The printed support 23 can, moreover, advantageously comprise a reference to a website of the Internet or to software distributed on a CD-ROM type support, so that the printer user downloads the software intended to read the 2D barcodes. The software is thus downloaded, for example, on the phonecam 1.

According to FIG. 3, once printed, the visual code is, for example, stuck on the electronic printing platform 18 at the location 22. According to a first embodiment, the visual code is self-adhesive, as described above, and stuck directly on the location 22. According to a second embodiment, the visual code is not self-adhesive and, in this case, a thin self-adhesive support, for example a plastic sheet, is placed on the location 22 and comprises readable instructions of the type: "Remove the protective layer to stick the printed identifier." In the last embodiment, the removable plastic sheet protects a thin layer of glue applied to the location 22 to stick the visual code that has just been printed.

The 2D code stuck on the printer 2 or on the electronic printing platform 18 is then captured with the image sensor 8 and scanned with the phonecam 1. The phonecam 1 comprises, moreover, a means for reading and decoding visual codes. This means for reading and decoding visual codes, coupled with software loaded in the phonecam 1, extracts the execution data of a command. The extracted command data, by means of reading and decoding the barcode, enables a connection to be made and command data to be transmitted to the printer 2 for it to execute them. The connection between the phonecam 1 and the printer 2 is preferably wireless, for example Bluetooth type. The command is, for example, the printing with the printer 2 of an image containing text, from the display of this image on the screen 7.

In a preferred embodiment of the invention, the visual code comprises the data of an executable program, intended for the phonecam 1. The executable program comprises automatic execution instructions of the image printing command to the printer 2. That is, the extracted command data enable a connection to be made automatically and the automatic transmission, for example without manual action on a button of the phonecam 1, of the command data to the phonecam 1, to execute these command data.

In an advantageous embodiment of the invention, the printer 2 that produces the visual code can have the capacity to also supply the algorithm (or program) of the software that is loaded in the phonecam 1, for example via a bus connected to the printer 2. The software can also be loaded in a memory card, for example of multi media card (MMC) type, compatible with the phonecam 1 or mobile phone 4.

According to a particular embodiment, if the phonecam 1 does not comprise means for reading and decoding visual codes, the visual code can be read and decoded, for example with the mobile phone 4 which, itself, comprises a means for reading and decoding visual codes. Then, when the command data are extracted, they are transmitted, by the link 5, to the phonecam 1, so as to have the command executed, from the phonecam 1. Electronic equipment items 1 and 4 can advantageously inter-communicate data with a Bluetooth link.

The equipment that produces the visual code is also that which executes the command data; the command is, for example, an image printing command. This equipment is, for example, the electronic platform 18 equipped with the display screen 28, or a photographic kiosk equipped with a display screen and a printing unit.

According to a particular embodiment of the invention method, to inter-connect the electronic equipment of the system, the printer's software is capable of editing a visual code intended for another device or electronic equipment that does not comprise means for printing the visual code. For example, a visual code specific to the phonecam 1 can be planned to facilitate pairing between the phonecam 1 and the mobile phone 4. In this case, the printer 2, when it is activated, identifies the data relative to the phonecam 1, such as for example the MAC address, with the link 5 and using recognition software included, for example, in the printer software 2. The identified data are used to produce the visual code relative to the phonecam 1.

According to a variant of the last embodiment, the data relative to the phonecam 1 can be identified via an intermediate terminal acting as a relay. The intermediate terminal is, for example, the mobile phone 4, placed according to the link 5, between the printer 2 and the phonecam 1. In this case, the mobile phone 4 contains specific software to identify data relative to the phonecam 1.

While the invention has been described with reference in particular to its preferred embodiment, it is apparent that the presented embodiment is illustrative and non-restrictive as regards the claimed protection; the claimed protection can cover variants and modifications corresponding to the invention's object and which can be added within the scope of the claims.

The invention has been described in detail with particular reference to certain preferred embodiments thereof, but it will be understood that variations and modifications can be effected within the scope of the invention.

PARTS LIST 1. first electronic equipment item
2. second electronic equipment item
3. other electronic equipment
4. other electronic equipment
5. communication link
6. display screen
7. display screen
8. image sensor
9. display screen
10. electronic equipment system
11. two dimensional visual code
12. two dimensional visual code
13. elementary module of visual code
14. elementary module of visual code
15. elementary module of visual code
16. elementary module of visual code
17. elementary module of visual code
18. electronic printing platform
19. command keyboard
20. command button
21. printing plate
22. location to receive a visual code
23. visual code support
24. visual code location
25. location to display legible instructions
26. legible instructions
27. pre-cut lines
28. display screen

The invention claimed is:

1. A command process of a first electronic equipment item forming part of a system of compatible electronic equipment, the system comprising a second electronic equipment item capable of producing a visual code and a third electronic equipment item capable of reading a visual code, the process comprising the following steps:
   a) in response to an activation of the second equipment item, the automatic production of a visual code comprising command execution data; and
   b) in response to the reading of the visual code by means of the third equipment item, the decoding of the visual code to extract command data from it and the transmission of the command data to the first equipment item to execute them with the second equipment item.

2. The process according to claim 1, wherein the visual code comprises the data of an executable program intended for the third equipment item and comprising the automatic execution instructions of step b).

3. The process according to claim 1, wherein the execution of the command, from the first equipment item, is a transmission and printing instruction of data, for example text and image, to the second equipment item.

4. The process according to claim 1, wherein the compatibility of the equipment is realized by a hardware and software configuration of the equipment of the system to perform data communications between the equipment.

5. The process according to claim 4, wherein the data communication between the equipment is performed using a wireless link, for example Bluetooth or Wi-Fi.

6. The process according to claim 1, wherein the activation of the second equipment item is a powering up of the second equipment item or a downloading of software into the second equipment item.

7. The process according to claim 1, wherein the production of the visual code is performed using a printing unit, like a printer for example.

8. The process according to claim 1, wherein the first equipment item and the third equipment item form a single terminal, like for example a digital camera or phonecam equipped with means for reading and decoding visual codes.

9. The process according to claim 1, wherein the visual code is a barcode, or a two dimensional code.

10. The process according to claim 9, wherein the visual code comprises equipment identification data, like for example an equipment network address expressed in alphanumeric form.

11. The process according to claim 9, wherein the visual code comprises data relating to physical data processing or data storage units specific respectively to the equipment.

12. The process according to claim 9, wherein the visual code comprises data specific to software implemented with the equipment.

13. The process according to claim 12, wherein the data specific to the software comprise data to make a connection between the three equipment items from the activation of the second equipment item.

14. The process according to claim 9, wherein the visual code comprises encryption data.

15. The process according to claim 9, wherein the visual code is an image displayed on a screen of the second equipment item.

16. The process according to claim 1, wherein the visual code is printed on a self-adhesive support, on paper for example.

17. The process according to claim 16, wherein the self-adhesive support can also comprise legible instructions for using the visual code.

18. The process according to claim 16, wherein the visual code is removable from the self-adhesive support, for example along pre-cut lines.

19. A system to command a first electronic equipment item forming part of a system of compatible electronic equipment; the system comprising a second electronic equipment item capable of producing a visual code when activated, and a third electronic equipment item capable of reading and decoding the visual code, the command of the first equipment item being performed according to the process in claim 1.

* * * * *